United States Patent [19]
Rodzewich et al.

[11] Patent Number: 5,801,217
[45] Date of Patent: Sep. 1, 1998

[54] CHROMIUM-FREE CONVERSATION COATING AND METHODS OF USE

[75] Inventors: Edward A. Rodzewich, Flourtown, Pa.; Jiangbo Ouyang, Flemington, N.J.; Joseph E. Murphy, Lansdale, Pa.

[73] Assignee: BetzDearborn Inc., Trevose, Pa.

[21] Appl. No.: 862,206

[22] Filed: May 22, 1997

Related U.S. Application Data

[62] Division of Ser. No. 734,429, Oct. 16, 1996, Pat. No. 5,693,371.

[51] Int. Cl.$^6$ ................................ C08K 3/20; C08L 63/00
[52] U.S. Cl. ........................................... 523/409; 523/421
[58] Field of Search ..................................... 523/409, 421

[56] References Cited

U.S. PATENT DOCUMENTS

| | | | |
|---|---|---|---|
| 4,191,596 | 3/1980 | Dollman et al. | 148/6.27 |
| 4,762,638 | 8/1988 | Dollman et al. | 252/135 |
| 5,026,440 | 6/1991 | Finnenthal | 148/247 |
| 5,053,081 | 10/1991 | Jacob | 106/287.11 |
| 5,282,905 | 2/1994 | Reichgott et al. | 148/247 |
| 5,356,490 | 10/1994 | Dolan | 148/247 |
| 5,427,632 | 6/1995 | Dolan | 148/259 |
| 5,518,770 | 5/1996 | Goliaszewski et al. | 427/327 |
| 5,531,820 | 7/1996 | Gorecki | 148/247 |

FOREIGN PATENT DOCUMENTS

WO85/05131  11/1985  WIPO.

*Primary Examiner*—Melvyn I. Marquis
*Assistant Examiner*—D. Aylward
*Attorney, Agent, or Firm*—Alexander D. Ricci; Philip H. Von Neida

[57] ABSTRACT

Methods and compositions for providing a conversion coating to a metal surface are provided. The methods comprise applying to a metal surface an aqueous composition comprising a diglycidyl ether of Bisphenol A, a fluoroacid, and a silicon compound containing a hydrolyzable group.

9 Claims, No Drawings

CHROMIUM-FREE CONVERSATION COATING AND METHODS OF USE

This is a divisional of application Ser. No. 08/734,429 filed Oct. 16, 1996, U.S. Pat. No. 5,693,371.

FIELD OF THE INVENTION

The present invention relates to a chromium-free conversion coating and methods for improving the corrosion resistance and adhesion of paints to metal surfaces. More particularly, the present invention provides for a dried in place coating on steel, aluminum and galvanized steel surfaces.

BACKGROUND OF THE INVENTION

The purpose of conversion coatings on metal surfaces is to provide corrosion resistance, improve aesthetic appearance, and improve the adhesion and the ultimate coating. The conversion coating improves the adhesion of final coating layers such as paints, inks, lacquers, plastics, and other siccative coatings.

Traditionally, chromates have been utilized as conversion coating compounds. Chromates are known to exhibit acceptable performance on different types of metals or alloys such as aluminum, steel, galvanized steel and zinc-aluminum coated steel. Chromate conversion coatings are typically administered by contacting the metal surface with an aqueous solution containing hexavalent or trivalent chromium ions, phosphate ions and/or fluoride ions. Serious concerns have been raised, however, regarding the pollution effects of the chromate or phosphate discharge into rivers or waterways by such processes. Due to the high solubility and the strongly oxidizing character of hexavalent chromium ions, conventional chromate conversion coating processes require extensive waste treatment procedures to control their discharge.

While many acceptable chromium-free conversion coatings have been developed, their utility is often limited to only one type of metal substrate. Many industrial operations, however, involve the sequential processing of different types of metals. Unless the undesirable chromium compounds are used, the industrial metal processor is forced to change the conversion coating bath for each different type of metal. This results in unacceptable downtime and higher processing costs.

SUMMARY OF THE INVENTION

The present invention provides for a metal pretreatment composition comprising an aqueous solution of a diglycidyl ether of Bisphenol A, a silicon compound containing a hydrolyzable group, and a fluoro acid. The present invention further provides for methods for using the composition to improve corrosion resistance and adhesion of paint to metal surfaces.

DESCRIPTION OF THE RELATED ART

U.S. Pat. No. 5,026,440 teaches a metal pretreatment composition comprising an aqueous solution of aluminum-zirconium complex which is obtainable as the reaction product of a chelated aluminum component, an organo-functional ligand component and a zirconium oxyhalide component. This pretreatment is followed by a treatment of the metal surface with one or more inorganic and/or organic film-forming materials.

U.S. Pat. No. 5,282,905 teaches methods of forming a conversion coating on metal surfaces comprising reacting the metal surface with an aqueous solution of a water soluble polyacrylic acid or homopolymer thereof, or a maleic or acrylic acid/allyl ether copolymer with or without an acid selected from the group consisting of acetic acid, glycolic acid, dihydrohexafluotitanic acid, dihydrohexafluozirconic acid, and fluoboric acid.

U.S. Pat. No. 5,518,770 teaches metal pretreating compositions comprising zinc and zirconium hydrolysates of a maleic anhydride: vinyltrialkoxysilane copolymer and zinc and zirconium hydrolysates of an acrylic acid: vinyltrialkoxysilane copolymer.

PCT application WO 85/05131 teaches an acidic aqueous coating solution of fluoride, metal salt, a sequestrant and a polymer which increases corrosion resistance when applied to galvanized metals. The polymer may be a polymer of (meth)acrylic acid or ester thereof.

U.S. Pat. No. 4,191,596 teaches an aluminum coating composition consisting essentially of a polyacrylic acid or ester thereof and an acid selected from the group consisting of fluozirconic, fluotitanic and fluosilicic acids.

DETAILED DESCRIPTION OF THE INVENTION

The present invention provides for a composition comprising an aqueous solution of (a) a diglycidyl ether of Bisphenol A, (b) a silicon compound containing a hydrolyzable group, and (c) a fluoroacid. The present invention also provides for methods for providing a coating to a metal surface. The pretreatment of the metal surface improves the adhesion of the coating to the metal and improves the resistance to corrosion.

The compositions of the present invention prove effective as pretreatment solutions for a variety of metal surfaces. These metals include but are not limited to aluminum, steel, zinc coated (galvanized) steel, and zinc-aluminum coated steel (Galvalume®, available from Bethlehem Steel, Inc.). It has been found that the application of the inventive pretreatment compositions to these metals improves their resistance to corrosion and adhesion of later-applied coatings.

In the methods of the present invention, the weight/weight ratio of (a) to (b) is from about 1:0.02 to 1:0.6 and the weigh/weight ratio of (c) to (a) and (b) is greater than 1:1.8.

The diglycidyl ether of Bisphenol A is a water soluble and/or dispersible polymer. The molecular weights range from 300 to 3600 with a range of 1000 to 3000 preferable. The polymer also preferably contains phosphorus in an amount ranging from about 0.1 to about 0.3 by weight as $PO_4$. Examples of this polymer useful in the invention are available commercially from Shell Oil Company as Epi Rez® 3551 which has a molecular weight of about 3000 and Epi Rez® 3520 which has a molecular weight of about 1000. Epotuf® 37-143 available from Reichhold Chemicals is a water dispersible epoxy resin similar to the Epi Rez® 3551.

The silicon compound containing a hydrolyzable group generally has the formula $R_n$—Si—$X_{(4-n)}$ which has hydrolyzable moieties which will hydrolyze in aqueous solutions to produce reactive silanol groups.

In the formula for the silicon compound, R is H, $C_1$ to $C_6$ alkyl which may be substituted with a primary or secondary amine, hydroxy, epoxy, vinyl and chloroalkyl group; or, phenyl, $C_4$ to $C_7$ cycloalkyl or phenyl substituted with an alkyl, a primary or secondary amine, a vinyl or a hydroxy group. X is a hydrolyzable moiety that will hydrolyze in aqueous solution to produce a reactive silanol group and is selected from an alkoxy group and a carboxy group. The alkoxy group includes but is not limited to methoxy, ethoxy, propoxy, butoxy, and pentoxy groups and the carboxy group includes but is not limited to the acetoxy group. n is an integer from 1 to 3.

Representative silicon compounds containing a hydrolyzable group include but are not limited to amino and epoxy functional silanes including γ-(glycidoxypropyltrimethoxy) silane available as Silquest® A187; γ-aminopropyltriethoxysilane available as Silquest® A-1100; and Bis-(γ-trimethoxysilylpropyl) amine available as Silquest® A-1170 from OSI Specialties, Inc.

The fluoroacid is preferably selected from the group consisting of fluorotitanic acid and fluorozirconic acid. The inventive composition may also contain a mixture of fluoroacids.

The composition of the present invention preferably comprises in water by weight:

0.001 to 0.25 weight percent. The method of pretreating the metal surfaces of the present invention necessitates application of the composition to the metal surface.

The application may be by any of several techniques familiar to those skilled in the art, such as spraying, immersion, by dip squeegee, flow coating, roll coating, and the like. The pretreatment composition is then dried in place utilizing conventional methods such as forced hot air.

The invention will now be further described with reference to a number of specific examples which are to be regarded solely as illustrative and not as restricting the scope of the invention.

EXAMPLES

The following compositions designated example nos. 1–12 were tested in the examples.

| Example | DI water | EPIREZ® 3551[1] | Silquest® A1170[2] | Silquest® A187[3] | Silquest® A1100[4] | $H_2ZrF_6$[5] | $H_2TiF_6$[6] | pH |
|---|---|---|---|---|---|---|---|---|
| 1 | 99.0 | 1.0 | — | — | — | — | — | 8.5 |
| 2 | 98.9 | 1.0 | — | — | — | 0.1 | — | 3.0 |
| 3 | 98.9 | 1.0 | — | 0.1 | — | — | — | 3.0 |
| 4 | 98.6 | 1.0 | 0.3 | — | — | 0.1 | — | 3.0 |
| 5 | 98.7 | 1.0 | 0.1 | 0.1 | — | 0.1 | — | 5.0 |
| 6 | 98.6 | 1.0 | — | 0.1 | — | 0.3 | — | 5.0 |
| 7 | 98.8 | 1.0 | — | 0.1 | 0.1 | — | — | 8.5 |
| 8 | 98.9 | 1.0 | 0.1 | — | — | — | — | 9.5 |
| 9 | 99.8 | — | — | 0.1 | 0.1 | — | — | 3.0 |
| 10 | 99.8 | — | — | 0.1 | 0.1 | — | — | 5.0 |
| 11 | 99.8 | — | — | 0.1 | 0.1 | — | — | 8.5 |
| 12 | 96.7 | 3.0 | — | 0.1 | — | 0.1 | 0.1 | 3.0 |

| | |
|---|---|
| Diglycidyl ether of Bisphenol A | 0.5 to 3.0% |
| fluoracids | 0.05 to 0.3% |
| Silicon compound containing a hydrolyzable Group | 0.05 to 0.3% |

The pH of the composition is controlled by the amount of fluoroacid compound present and is preferably maintained in the acid range. Preferably this range is 2.0 to 5.0 with a range of 2.5 to 3.5 more preferable.

In a preferred embodiment of the present invention the composition comprises by weight percent:

| | |
|---|---|
| Deionized water | 98.7% |
| EPI REZ® 3551 | 1.0% |
| Silquest® A187 | 0.1% |
| fluorozirconic Acid (45%) | 0.1% |
| fluorotitanic Acid (60%) | 0.1% |

Optionally, appropriate surfactants and water soluble polyvinyl alcohols can be added to the inventive composition to improve upon the wetting and spreading properties of the mixture. Typical of these surfactants is Surfonic® N-95 which is available from Texaco Corp which is an ethoxylated nonyl phenol. Representative polyvinyl alcohols are available from Air Products as Air Vol® 540 and having a molecular weight of approximately 125,000.

The surfactant is added in amounts necessary to improve the degree of wetting and may vary from 0.01 to 1.0 weight percent. Similarily, the polyvinyl alcohol can be added from Test pieces of various test metals were spray cleaned with an aqueous aklaline cleaner for 30 seconds and subsequently rinsed with cold water to produce a water break free surface. The excess water is squeeged and the clean metal surface is spin coated with the acidic composition and flash dried using a hot air gun. The panels were subsequently painted with a conventional paint according to the manufacturer's specifications. The following paint system was used to evaluate the dried in place coating's performance: White Polyester paint 408-1W1590 from Specialty Coatings Company, Inc.

The effectiveness of these compositions was evaluated with a variety of paint adhesion tests familiar to those skilled in the art. These tests include "T-Bend": The tendency of paint to disadhere from a 180° bend in the metal (OT equals perfect) according to ASTM Method D4145-83; "Impact" with 120 inch pounds according to ASTM Method D2744-84E1; and "Neutral Salt Spray (NSS)" tests per ASTM Method B-117-90 for 144 hours with total scribe creepage values reported in inches.

The test results using 1010 cold rolled steel coupon are presented in Table I.

TABLE I

| Example No. | T-Bend | Impact | Neutral Salt Spray (Inches) |
|---|---|---|---|
| 1 | 2T | 10 | >16/64 |
| 2 | 1T | 10 | >16/64 |
| 3 | 1T | 10 | >16/64 |

TABLE I-continued

| Example No. | T-Bend | Impact | Neutral Salt Spray (Inches) |
|---|---|---|---|
| 4 | OT | 10 | 4/64 |
| 5 | OT | 10 | 4/64 |
| 6 | OT | 10 | 1/64 |
| 7 | O-1T | 10 | >16/64 |
| 8 | O-1T | 10 | >16/64 |
| 9 | O-1T | 10 | >16/64 |
| 10 | O-1T | 10 | >16/64 |
| 11 | O-1T | 10 | >16/64 |
| 12 | OT | 10 | 2/64 |
| 10% Bonderite ® 1955 | OT | 10 | 8/64 |

As demonstrated in Table I, the inventive composition as embodied in examples 4, 5, and 6 proved as or more effective than the use of the diglycidyl ether bisphenol A, hydrolyzable silicon compounds and fluoroacids, either individually or in various combinations.

ACT electrogalvanized metal was processed according to a conventional procedure: cleaning with 3% Betz Kleen® 4010, available from BetzDearborn Inc., Trevose, Pa., at 130° F. for 10 seconds, followed by rinsing with tap water for 5 seconds, then squeegeeing to remove excess water and spin-applying treatment solutions. Paints were applied to the treated metal using draw down bars and cured according to manufacturer's specifications.

The inventive composition comprising 1 % of EPI-REZ® 3551, 0.1 % Silquest® A-187 and 0.2% $H_2ZrF_6$ (45% solution) by weight was tested along with a commercially available chromium-based pretreatment, PERMATREAT® 1500 (at 15% solution) available from BetzDearborn Inc., Trevose, Pa. The results of the adhesion and accelerated corrosion tests are presented in Table 11.

TABLE II

| Treatment | T-Bend | NSS (5000 HR) Scribe | NSS (500 HR) Field | NSS (750 HR) Scribe | NSS (750 HR) Field |
|---|---|---|---|---|---|
| Permatreat ® 1500[1] | 0/0 | 7 | 9 | 5/7 | 7/9 |
| Inventive[1] | 0/1 | 5 | 9 | 6/7 | 8/8 |
| Permatreat ® 1500[2] | 0/0 | 5 | 10 | 4/4 | 10/10 |
| Inventive[2] | 0/0 | 5 | 10 | 5/5 | 10/10 |

[1]Lilly Two-Coat paint
[2]Sherwin Williams Two-Coat paint
*Duplicate samples were used and rated As demonstrated in Table 11, the inventive composition proved as effective as the chromate-based product at adhesion and at corrosion resistance.

ACT electrogalvanized metal was cleaned and treated as described in example 2. A specialty single coat paint utilized on a commercial coil coating line was employed. The painted panels were tested for NSS performance for various durations. The performance of the treatments are reported according to an arbitrary rating procedure: panels removed from the NSS were rinsed with tap water and air dried, but not scraped or blown with forced air. The panels were rated according to the area covered by blisters and blister density. The results of this testing are reported in Table III.

TABLE III

NSS Performance 750 Hours and 1000 Hours

| Pre-treatment | 750 Hour | | | 1000 Hour | | |
|---|---|---|---|---|---|---|
| | NSS Scribe | NSS Field | Edge Creepage (mm) | NSS Scribe | NSS Field | Edge Creepage (mm) |
| A | 9.5 | 8.5 | 8 | 9 | 8 | 21.5 |
| B | 7.5 | 8.5 | 10.5 | 5 | 7.5 | 16.5 |
| C | 9.5 | 8.5 | 7 | 9 | 8 | 13 |

A is 10% Permatreat ® 1500
B is 10% Permatreat ® 1011 (Non-Chromate Based Pretreatment)
C is 1% EPI-REZ ® 3551 0.1% Silquest ® A-187 0.1% $H_2ZrF_6$ (45% solution) 0.1% $H_2TiF_6$ (60% solution)

As demonstrated in Table III, the inventive composition containing a mixture of fluoroacids performed better than both a chromium-based and chromium-free commercial pretreatments at inhibiting corrosion.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A chromium-free conversion coating composition consisting essentially of a diglycidyl ether of Bisphenol A, a silicon compound containing a hydrolyzable group, a fluoroacid selected from the group consisting of fluorotitanic acid and fluorozirconic acid, and water.

2. The composition as claimed in claim 1 wherein said diglycidyl ether of Bisphenol A has a molecular weight ranging from about 300 to about 3600.

3. The composition as claimed in claim 1 wherein said diglycidyl ether of Bisphenol A contains phosphorous in an amount ranging from about 0.10 to about 0.30 weight percent.

4. The composition as claimed in claim 1 wherein said silicon compound containing a hydrolyzable group has the formula $R_n$—Si—$X_{(4-n)}$ wherein R is H, $C_1$ to $C_6$ alkyl, $C_1$ to $C_6$ alkyl substituted with a primary or secondary amine, a hydroxy, and epoxy, a vinyl or a chloroalkyl; or phenyl, $C_4$ to $C_7$ cycloalkyl or phenol substituted with an alkyl, primary or secondary amine, a vinyl or a hydroxy group; X is a hydrolyzable moiety selected from the group consisting of an alkoxy group and a carboxy group; and n is 1 to 3.

5. The composition as claimed in claim 4 wherein said silicon compound is selected from the group consisting of γ-(glycidoxypropyltrimethoxy) silane, γ-aminopropyltriethoxy silane, and Bis-(γ-trimethoxysilylpropyl) amine.

6. The composition as claimed in claim 1 wherein said composition has a pH of about 2.0 to about 5.0.

7. The composition as claimed in claim 1 wherein said aqueous composition comprises, by weight, from about 0.5 to about 3.0 percent diglycidyl ether of bisphenol A, from about 0.05 to about 0.3 percent fluoroacid, and from about 0.05 to about 0.3 percent silicon compound containing a hydrolyzable group.

8. The composition as claimed in claim 1 wherein said composition further comprises a surfactant.

9. The composition as claimed in claim 1 wherein said composition further comprises polyvinyl alcohol.

* * * * *

UNITED STATES PATENT AND TRADEMARK OFFICE
CERTIFICATE OF CORRECTION

PATENT NO. : 5,801,217
DATED : September 1, 1998
INVENTOR(S) : Rodzewich, et al.

It is certified that error appears in the above-identified patent and that said Letters Patent is hereby corrected as shown below:

On the title page: Item [54] and Column 1, line 1-2, should read

Chromium-Free Conversion Coating and Methods of Use

Signed and Sealed this

Second Day of March, 1999

*Attest:*

Q. TODD DICKINSON

*Attesting Officer*     *Acting Commissioner of Patents and Trademarks*